(No Model.)

H. BARNETT.
TOOL.

No. 420,671. Patented Feb. 4, 1890.

WITNESSES:
F. McArdle.
C. Sedgwick.

INVENTOR:
H. Barnett
BY Munn & Co.
ATTORNEYS.

UNITED STATES PATENT OFFICE.

HORATIO BARNETT, OF MALVERN, ARKANSAS.

TOOL.

SPECIFICATION forming part of Letters Patent No. 420,671, dated February 4, 1890.

Application filed September 18, 1889. Serial No. 324,289. (No model.)

*To all whom it may concern:*

Be it known that I, HORATIO BARNETT, of Malvern, in the county of Hot Spring and State of Arkansas, have invented a new and useful Improvement in Tools, of which the following is a full, clear, and exact description.

My invention relates to an improvement in tools, and has for its object to provide a combined tool and handle capable of use in screwing ceiling-hooks and screw-eyes to place, and which may also be employed to clamp a saw or an auger for the purpose of sawing or boring articles above the operator's head.

A further object of the invention is to provide a tool whereby articles may be elevated to high shelving or removed therefrom, or may be hung upon or taken from elevated hooks, thus dispensing with scaffolding or the use of steps or step-ladders.

The invention consists in the novel construction and combination of the several parts, as will be hereinafter more fully set forth, and pointed out in the claim.

Reference is to be had to the accompanying drawings, forming a part of this specification, in which similar figures of reference indicate corresponding parts in all the views.

Figure 1:
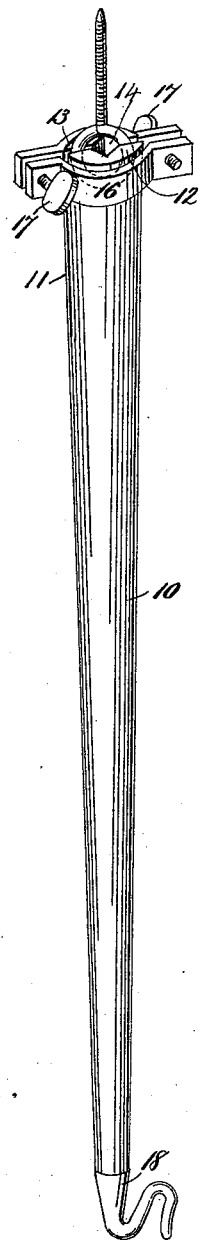
Figure 2:
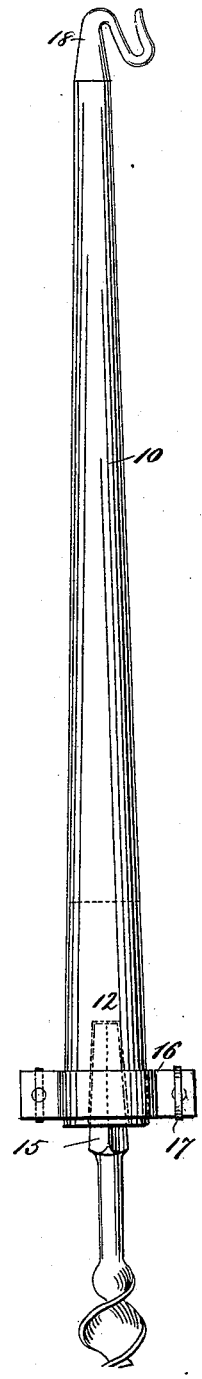

Figure 1 is a perspective view of the tool, illustrating a screw-eye clamped therein. Fig. 2 is a side elevation of the tool, illustrating an auger clamped therein; and Fig. 3 is a partial side elevation and longitudinal section illustrating the socket adapted to receive an auger and the slot in which the hook, saw, or other equivalent article is inserted.

The body of the invention consists of a rod or pole 10, which may be constructed of wood, metal, or any desired material. This rod or pole, which may be of any length, is preferably made larger at one end than at the other, the larger end being ordinarily essentially oval in cross-section and the smaller end circular.

Figure 3:
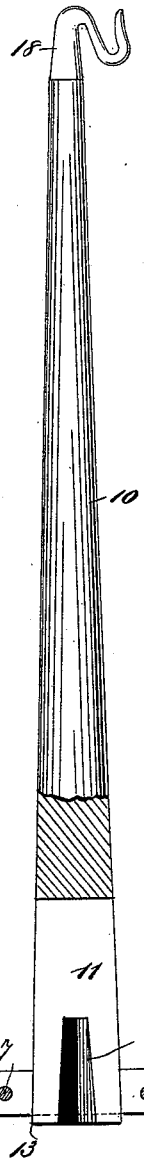

In the larger or oval end of the body 10 a longitudinal slot 11 is produced, extending through from side to side, whereby two spring-jaws 12 and 13 are provided, and in the inner opposed faces of these jaws 12 and 13 aligning longitudinal recesses 14 are produced, as best illustrated in Fig. 3, which recesses are ordinarily made angular, in order to receive and grasp the rectangular shank 15 of a tool, such as an auger, as illustrated in Fig. 2.

In the slot 11 the head of a hook or screw-eye is introduced when the same is to be screwed into position, as illustrated in Fig. 1, and such an article as a saw-blade may likewise be inserted in the slot 11. In order that the article inserted in the body may be rigidly secured or held stationary between the jaws 12 and 13, I employ a clamp 16, which clamp is adapted to slide upon the enlarged end of the body 10, and usually consists of two straps shaped to the external contour of the body, having their ends united by set-screws 17. Thus in operation, after the desired article has been introduced between the jaws of the body, the clamp is slid down essentially to the outer ends of the jaws and the set-screws tightened, whereby the sections of the clamp are made to bind the jaws against the article, as shown in Figs. 1 and 2.

If, for instance, it is desired to screw a hook or screw-eye in the ceiling, the head of the hook or eye is secured in the slotted end of the body, as shown in Fig. 1, and the clamp tightened. The screw portion of the eye or hook may now be readily introduced into the ceiling by turning the handle 10, and when the hook or eye has been secured in the ceiling the body may be detached from the said hook or eye by simply drawing downward upon the former, as in this instance the clamp is tightened only sufficiently to prevent the head of the hook or eye from turning laterally in the handle.

Upon the smaller end of the body 10 a hook 18 is rigidly fastened, which hook is preferably so bent as to be practically parallel with the longitudinal axis of the body, as shown in the drawings. This hook may be utilized to place goods of any description upon high shelves or to remove them therefrom; likewise to place goods upon ceiling-hooks or to remove them from the same.

When a saw, auger, or other article is introduced between the jaws of the body, the set-screws 17 are so manipulated that the clamps will firmly and rigidly bind the said jaws to said article.

It is obvious that my improved tool and tool-handle may also be utilized in topping, trimming, and pruning trees, vines, &c., or may be handily employed in connection with any work to be done over the workman's head, or at a distance in any direction.

Having thus described my invention, I claim as new and desire to secure by Letters Patent—

As an improved article of manufacture, a tool consisting of the pole or rod 10, provided with the hook 18 at one end and at its other end with the jaws 12 and 13, having recesses 14, and the clamp 16 17, fitting on the end of the rod or pole, provided with the jaws, as set forth.

HORATIO BARNETT.

Witnesses:
 BENJ. BERGER,
 W. H. RODGERS.